Patented June 9, 1953

2,641,584

UNITED STATES PATENT OFFICE 2,641,584

ADHESIVE COMPOSITIONS, INCLUDING AN AMYLACEOUS MATERIAL AND A TRIAZONE

Thomas A. Martone, Jr., Wilmington, Del., assignor to E. I. du Pont de Nemours and Company, Wilmington, Del., a corporation of Delaware No Drawing. Application October 26, 1951, Serial No. 253,447

6 Claims. (Cl. 260—17.3)

1

This invention relates to new aqueous starch-resin compositions which find application as adhesives and finishing compositions in the paper industry.

Aqueous starch compositions have been used extensively in the paper trade as adhesives, particularly for box board, and as binders for pigments in surface applications. In the absence of other ingredients, such starch compositions are not water-resistant. Furthermore it is necessary to employ large amounts in order to obtain a suitable degree of adhesion. In order to improve the water-resistance of the starch composition, it has been common practice to incorporate resins of various sorts into the formulations. Partially condensed urea-formaldehyde resins, or materials such as dimethylolurea which may be condensed to form urea-formaldehyde resins, and melamine resins are frequently used in this connection. Such starch-resin compositions are usually prepared and applied at temperatures ranging from 70 to 120° F. A catalyst, usually an acid or acid-reacting catalyst, is ordinarily added to the mix, in order to secure setting of the starch-resin mixture after it is applied to the paper or board. Unfortunately, however, the starch-resin formulations containing the catalyst tend to thicken up and to form insoluble deposits unless they are applied almost immediately after being prepared. If they are permitted to stand, they frequently become difficult or impossible to pump and to apply in the conventional mill equipment, or at best, the equipment be reset in order to accommodate the thicker paste.

It is an object of this invention to provide a composition containing an amylaceous material, water-soluble triazone compounds and an acid-reacting catalyst, which shows relatively little change in viscosity upon aging and which has a satisfactory glue or pot life of at least 24 hours. A further object is to provide such a composition which yields water-resistant, adhesive films when applied to a paper or board surface and insolubilized thereon. Still further objects will appear from the detailed description of this invention which follows.

I have found that these objects may be accomplished by the use of an aqueous adhesive and finishing composition which contains from 10 to 30% of an amylaceous material, from 0.5 to 2% aluminum sulfate calculated as the anhydrous salt, and from 0.3 to 5% of a water-soluble reaction product of urea, formaldehyde and a primary amine, said reaction product containing triazone rings in which methylene groups are attached to the nitrogen atoms adjacent to the carbonyl group.

2

When urea, formaldehyde and the primary amine are reacted together in suitable proportions in mildly alkaline solution, a product containing a methylolated triazone ring is formed. The reactions involved may be formulated as follows, using methylamine as a typical primary amine.

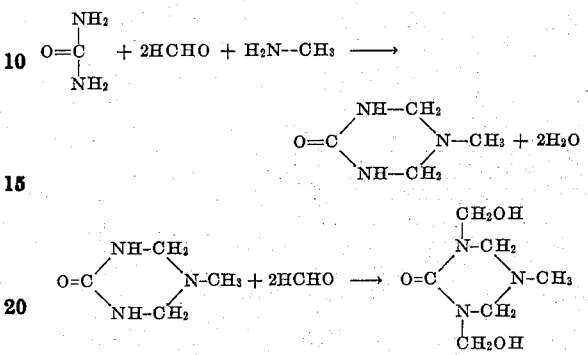

The methylolated triazone compound may be used in this form in the starch composition, or it may be subjected to an acid condensation to form a water-soluble triazone resin which may be used in the starch composition and which is capable of further condensation after the composition is applied to the paper or board. In this acid condensation, the individual triazone units become linked to one another by methylene groups which are formed by the elimination of water and formaldehyde in the methylol groups.

In a representative and preferred preparation of the triazone compound, one mole of diethylene triamine, three moles of urea and six moles of formaldehyde are reacted together at a temperature from 80 to 85° C. in an aqueous solution adjusted with sodium carbonate to a pH of 8.5 to 9. This mixture is cooled to 60° C. and four additional moles of formaldehyde are added to form a methylol derivative of the triazone compound. This material is in condition for use without any condensation and may be incorporated directly with the starch and aluminum sulfate into an adhesive composition. If it is preferred to use the triazone compound in the form of a partially condensed resin, this solution of the methylolated triazone compound is acidified with hydrochloric acid to a pH of from 1 to 3 and the solution is heated for 25 minutes at 70 to 75° C. It is then neutralized with sodium hydroxide solution and cooled to yield an amber solution of the desired resin.

The triazone compounds may be prepared using primary monoamines and particularly a member of the class of primary monoamines consisting of the lower alkyl monoamines, such as methylamine, ethylamine, propylamine, isopropylamine, n-butylamine and n-hexylamine; the lower hydroxyalkyl monoamines such as ethanolamine and isopropanolamine; and the cycloalkyl monoamines such as cyclopentylamine and cyclohexylamine. The alkyl and hydroxalkyl monoamines containing up to six carbon atoms are most useful.

Another useful group of triazone compounds are those which may be prepared using as the primary amine a linear polyamine containing from two to eight carbon atoms, two primary amino groups and from zero to three secondary amino groups, the nitrogen atoms in the polyamine being separated by at least two carbon atoms from one another. Included in this group of compounds are the ω-diamines such as ethylenediamine, propylenediamine, and hexamethylenediamine, and also polyamines having the general formula $NH_2-(CH_2-CH_2-NH)_yH$, in which $y$ is an integer from 1 to 4. The polyamines of this type include diethylenetriamine, triethylenetetramine and tetraethylenepentamine. Diethylenetriamine and triethylenetetramine are the preferred polyamines.

When a polyamine is employed in the formation of the triazone compound, the resulting uncondensed product will ordinarily contain two triazone rings, one being formed at each primary amino group. In some cases however only one instead of both of the primary amino groups in the polyamine will be reacted with the urea and formaldehyde, so that the units that later condense together to form the resin may vary considerably in structure. When the linear polyamine contains one or more secondary amino groups such as in diethylenetriamine,

dimethylolurea formed from the urea and formaldehyde may add at this point, giving a further base for condensation with other triazone units.

In preparing the triazone compounds, the urea and formaldeyhde may first be heated together and the primary amine added thereafter, or all three ingredients may be added simultaneously. Furthermore, instead of adding the extra quantity of formaldeyhde needed to form the methylol groups after the formation of the triazone rings, the entire amount of formaldehyde may be added originally.

Ordinary it will be desirable to use one mole of urea for each amino group in the primary amine, whether the amino groups are primary or secondary. It has been found however that products of high quality may be prepared when using as little as 0.75 mole of urea for each primary amino group. The amount of urea to be used may therefore be represented as from $0.75p$ to $n$ moles for each mole of the primary amine, where $p$ represents the number of primary amino groups and $n$ represents the total number of amino groups in each molecule of primary amine. Thus when ethylamine is used, the preferred amount of urea is from 0.75 to 1 mole per molecule of the monoamine; when ethylenediamine is used, the preferred amount of urea is from 1.5 to 2 moles per molecule of diamine; and when diethylenetriamine is used, the preferred amount of urea is from 1.5 to 3 moles per molecule of triamine. Use of a moderate excess of urea is not harmful, although the excess cannot take part in the reaction with the amine. The use of still larger amounts results in the formation of resins resembling conventional urea-formaldeyhde resins rather than the triazone resins.

Enough formaldehyde should be employed to convert all of the urea to dimethylolurea and also to furnish an average of at least 1.5 additional methylol groups for each triazone ring, i. e., for each primary amino group in the primary amine. This minimum amount of formaldehyde may be expressed as $(2u+1.5p)$ moles for each mole of the primary amine, where $u$ represents the number of moles of urea used and $p$ represents the number of primary amino groups in each molecule of the amine. It is necessary that the quantity of formaldehyde corresponding to $2u$ be added with the urea in the original reaction mixture, while the amount corresponding to $1.5p$ may be added at that time or after the formation of the triazone rings. In most cases it is desirable to employ some excess of formaldehyde, up to about twice the minimum amount. An even greater excess of formaldehyde is not harmful except from the standpoint of economy.

The initial reaction between urea, formaldehyde and the primary amine is carried out in alkaline solution, preferably at a pH of from 7.1 to 9.5 This alkalinity is suitably obtained by addition of sodium carbonate. The reaction is ordinarily carried out in aqueous solution at a temperature of from 80 to 85° C. When additional formaldehyde is to be added after the formation of the triazone rings, it is convenient to cool the solution to from 55 to 65° C. prior to this addition, in order to avoid excessive loss of formaldehyde by evaporation. The formaldehyde is preferably added as an aqueous solution which has been made alkaline with sodium carbonate prior to use.

When it is wished to convert the triazone compound into a resin before incorporating it in the starch composition, the condensation is carried out at a pH of from 0.25 to 4.0, which is attained by the use of non-oxidizing inorganic acids or by inorganic salts which hydrolyze to give an acid reaction. The preferred pH is from 1 to 3 and hydrochloric acid is the preferred acidifying agent. The condensation is carried out at a temperature between 55 and 95° C. The duration of the reaction depends on the temperature and on the pH and may vary from about 3 to 25 minutes, shorter times being used at the higher temperatures and lower pH values. The condensation is interrupted while the resin is still water soluble, preferably by neutralizing and cooling the reaction mixture. A convenient procedure is to add 20% sodium hydroxide until the pH of the solution is from 6.9 to 7.1.

The new starch-resin compositions of this invention may be prepared from the ingredients by any conventional procedure for preparing waterproof starch adhesives. In one such procedure, a portion of the starch is mixed with the triazone resin or resin-forming solution and water and is cooked at about 190° F. until complete gelatinization is obtained. This mixture is then cooled to room temperature and thoroughly blended with the remaining starch, water and aluminum sulfate. Alternatively, the triazone compound and the catalyst may be added to the gelatinized starch solution after the heating period. To prevent premature reaction, the starch gelatinization is always carried out in the absence of the catalyst.

When ordinary waterproof starch compositions are prepared in this way, they must be used promptly so as to avoid excessive thickening or insolubilization. The compositions of this invention display substantially less change in viscosity upon standing. This is demonstrated by the following results.

*Example 1*

A suspension of 20 parts of 40 fluidity starch in water is heated to 190° F. and held at this temperature for ten minutes after the first appearance of gelatinization. The mixture is cooled to room temperature, and there is added a commercial 65% aqueous urea-formaldehyde resin solution containing one part of resin, and thereafter 0.1 part alum, calculated as the anhydrous salt. The total amount of water present is 77.9 parts.

A second starch-resin mixture is prepared which is identical except that one part of a triazone resin prepared using diethylenetriamine is employed in place of the urea resin.

The two mixtures are allowed to stand at 78° F. After two hours, the viscosity of the mixture containing the urea resin has increased 18.7%, and after twenty hours, 52.3%. After standing for the same lengths of time, the viscosity of the mixture containing the triazone resin has increased 5.1 and 29.9%, respectively.

*Example 2*

The same triazone resin used in Example 1 is compared with a commercial solid urea-formaldehyde resin in a conventional starch mixture used in the manufacture of corrugated box board. In this application, two starch mixtures are made up as follows:

| Ingredient | Carrier | Base |
|---|---|---|
| Starch (raw)_____g__ | 10 | 66.6 |
| Water_____g__ | 72.6 | 123.3 |
| Resin_____g__ | 4.2 | _____ |
| Alum_____g__ | _____ | 6.6 |

The carrier phase is cooked at 190° F. and held there for 10 minutes with agitation. It is cooled to room temperature and added to the base phase in a Waring Blendor in which the mixture is held for two minutes. The mixtures are allowed to stand at room temperature and tested for viscosity changes. After 18 hours the viscosity of the urea-formaldehyde formulation has increased 650%, while that of the triazone resin has increased only 62%.

The compositions of this invention display excellent adhesive and binding properties and are resistant to water. Their use is illustrated by the following examples.

*Example 3*

A bis-triazone resin prepared from three moles of urea, ten moles of formaldehyde and one mole of diethylenetriamine is tested in a waterproof starch adhesive composition. In this preparation, a base portion is made up from 33.3 g. of converted starch, 61.7 g. of water and 3.3 g. of $Al_2(SO_4)_3.18H_2O$. A carrier portion, composed of 6.0 g. of the same converted starch, 1.4 g. of resin and 33.3 g. of water, is cooked in a water bath to 190° F. and held at this temperature for 10 minutes for complete gelatinization, and then cooled to room temperature. This portion is then added slowly to the base portion and the combined portions are mixed in a Waring Blendor for 1 minute.

The resulting adhesive is applied at room temperature to the tips of the corrugations of a single-facer board (a liner plus the corrugated medium) by means of a conventional roller applicator. The latter is adjusted to apply a coating 0.018 inch thick. A piece of 0.016 inch liner board is then placed on the single-facer corrugation and the adhesive is set by holding a flat iron, heated to about 310° F., on top of the liner board for 20 seconds. The starch mixture has a satisfactory pot life, in contrast to that of a urea-formaldehyde mix which thickens very markedly upon standing.

The corrugated board made in this manner is allowed to age for one week at room temperature. It is then immersed in water for 24 hours and the adhesion is tested while the board is wet. This is done by removing the original liner and measuring the strength of the bond between the top liner and the corrugated medium, by fastening the corrugated medium in one jaw of the tester and the liner in the other jaw. The instrument is a commercially-available tensile tester operating at a constant rate of elongation. Load-extension values are obtained from it by observation of the electronic recording instrument.

In this manner a wet-adhesion value of 0.357 lb. is obtained, compared to zero for starch alone and 0.312 for a solid urea-formaldehyde composition.

*Example 4*

In the same manner described in Example 3, adhesive compositions are prepared using each of the triazone compounds shown below, both in the form of the uncondensed methylolated triazone and as a partially acid-condensed triazone resin. In each case the pot life is satisfactory. The mixtures are tested as adhesives for corrugated box board as in Example 3, with the following results:

| Triazone | Wet-adhesion (lbs.) | |
|---|---|---|
| | Uncondensed | Acid-condensed |
| $\begin{array}{c} CH_2OH \\ | \\ N-CH_2 \\ OC \diagup \quad \diagdown N-CH_2.CH_2OH \\ \diagdown \quad \diagup \\ N-CH_2 \\ | \\ CH_2OH \end{array}$ | 0.226 | 0.224 |
| $\begin{array}{c} CH_2OH \\ | \\ N-CH_2 \\ OC \diagup \quad \diagdown N-CH_3 \\ \diagdown \quad \diagup \\ N-CH_2 \\ | \\ CH_2OH \end{array}$ | 0.205 | 0.226 |
| $\begin{array}{c} CH_2OH \quad\quad CH_2-CH_2 \\ | \quad\quad\quad\quad \diagup \quad\quad \diagdown \\ N-CH_2 \quad\quad\quad\quad CH_2 \\ OC \diagup \quad \diagdown N-CH \quad\quad | \\ \diagdown \quad \diagup \quad\quad CH_2-CH_2 \\ N-CH_2 \\ | \\ CH_2OH \end{array}$ | 0.232 | 0.333 |
| $\begin{array}{c} CH_2OH \quad\quad\quad\quad\quad\quad CH_2OH \\ | \quad\quad\quad\quad\quad\quad\quad\quad | \\ N-CH_2 \quad\quad\quad\quad CH_2-N \\ OC \diagup \quad \diagdown N-CH_2-CH_2-N \diagup \quad \diagdown CO \\ \diagdown \quad \diagup \quad\quad\quad\quad\quad\quad \diagdown \quad \diagup \\ N-CH_2 \quad\quad\quad\quad CH_2-N \\ | \quad\quad\quad\quad\quad\quad\quad\quad | \\ CH_2OH \quad\quad\quad\quad\quad\quad CH_2OH \end{array}$ | 0.219 | 0.208 |

Example 5

Example 3 is repeated using a composition containing the same triazone resin but at 5% concentration instead of 1%. The pot life is satisfactory, and the wet-adhesion value is 0.416 lb.

Example 6

The resin of Example 3 is tested in a starch formulation for the surface covering of paper box board. The conventional starch mixture for this purpose contains 140 g. of a 25% starch solution, 32 g. of a 65% clay dispersion in water, 8 g. of titanium dioxide, 38 g. of water, 3 g. of the acid dye of Colour Index No. 252 and 2 g. of alcohol. To 11.1 g. of this mixture are added 2.0 g. of a 25% solution of the resin previously mixed with 1.33 g. of water, and then 0.25 g. of alum ($Al_2(SO_4)_3 \cdot 18H_2O$), giving resin and starch concentrations of 3.4% and 11.9%, respectively. The catalyst concentration calculated as the anhydrous salt is 0.9%.

This coating mixture is applied to 0.016 inch liner board in a very thin layer with a conventional wire-covered coating rod. The coating is dried in air until the wet sheen of the coating disappears. It is cured in a hot-air circulating oven for 30 minutes at about 220° F.

The board is then tested for water bleed fastness by wetting a sample and pressing it against a piece of white blotter paper. The amount of dye transferred to the blotter paper is noted. It is found that the board coated by the above-described procedure holds its color much more tenaciously than a control sample containing no resin. It is also superior to a control in which a commercial urea-formaldehyde resin is used.

During the use of this starch mixture its viscosity increases slowly as compared to that of the control mix containing a commercial urea-formaldehyde resin.

Any of the ordinary forms of starch may be employed in the composition. Thus corn starch, tapioca starch, potato starch and the various flours containing starch as the principal ingredient may be employed. Modified or converted starches such as the various thin boiling and oxidized starches may also be used. The term "amylaceous material" as used in the specification and claims is intended to include all of these forms of starch and starch derivatives.

Although aluminum sulfate in the common form of paper-maker's alum is the preferred acid-reacting catalyst, other compounds having an acid reaction such as ammonium sulfate or ammonium chloride may be used. The catalyst may be added as the anhydrous salt, although it is ordinarily more convenient to employ a hydrate.

The relative amounts of starch, resin and catalyst in the composition may be varied to some extent but the proportions described heretofore are those which I have found to be most generally useful. If smaller amounts of the triazone compound are used, the water resistance of the composition suffers, while the use of larger amounts is uneconomical. Ordinarily the compositions will not contain any adhesive ingredients other than starch and the triazone compound, although it may in some cases be desired to add other compatible resins to the formation. The compositions of this invention are particularly useful in the production of corrugated box board. They may also be applied to the entire surface of box board to give a scuff-resistant, water-resistant, finish which affords good protection to the box. They may also be used in coloring container board or in paper coating generally by adding suitable quantities of dye, clay, titanium dioxide, or other conventional colors, fillers and the like.

1. An aqueous adhesive and finishing composition which contains from 10 to 30% by weight of an amylaceous material, from 0.5 to 2% by weight aluminum sulfate calculated as the anhydrous salt, and from 0.3 to 5% by weight of a water-soluble reaction product of urea, formaldehyde and a primary amine, said reaction product containing triazone rings in which methylene groups are attached to the nitrogen atoms adjacent to the carbonyl group, said triazone rings being formed during reaction of the urea, formaldehyde and the amine in alkaline solution, there being employed in the preparation of the said reaction product for each mole of the primary amine from $0.75p$ to $n$ moles of urea, where $p$ represents the number of primary amino groups and $n$ represents the total number of amino groups in each molecule of primary amine, and at least $(2u+1.5p)$ moles of formaldehyde, where $u$ represents the number of moles of urea used.

2. A composition according to claim 1 in which the primary amine employed in the preparation of the water-soluble reaction product is a primary monoamine selected from the class consisting of lower alkyl monoamines, lower hydroxyalkyl monoamines, and cycloalkyl monoamines.

3. A composition according to claim 1 in which the primary amine employed in the preparation of the water-soluble reaction product is a linear polyamine containing from two to eight carbon atoms, two primary amino groups and from zero to three secondary amino groups, the nitrogen atoms in the said polyamine being separated by at least two carbon atoms from one another.

4. A composition according to claim 1 in which the primary amine employed in the preparation of the water-soluble reaction product is diethylenetriamine.

5. A composition according to claim 1 in which the water-soluble reaction product is a triazone resin obtained by reacting in alkaline solution a mixture of urea, formaldehyde and a primary amine, there being employed for each mole of the primary amine from $0.75p$ to $n$ moles of urea, where $p$ represents the number of primary amino groups and $n$ represents the total number of amino groups in each molecule of primary amine, and at least $(2u+1.5p)$ moles of formaldehyde, where $u$ represents the number of moles of urea used; and thereafter condensing the reaction product at a pH of 0.25 to 4 and interrupting the condensation while the resin is still water-soluble.

6. A composition according to claim 1 in which the water-soluble reaction product is a triazone resin obtained by reacting in aqueous solution at a pH of 8.5 to 9 and at 80 to 85° C. a mixture of one mole of diethylenetriamine, three moles of urea and six moles of formaldehyde; cooling to 60° C. and adding an additional four moles of formaldehyde; condensing the reaction product by heating to 70 to 75° C. for 25 minutes at a pH of 1 to 3; and neutralizing and cooling the resulting resin solution.

THOMAS A. MARTONE, JR.

No references cited.